United States Patent

Dieck et al.

[11] 4,073,824
[45] Feb. 14, 1978

[54] POLYPHOSPHAZENE BLENDS

[75] Inventors: Ronald L. Dieck; Edwin J. Quinn, both of Lancaster, Pa.

[73] Assignee: Armstrong Cork Company, Lancaster, Pa.

[21] Appl. No.: 802,307

[22] Filed: June 1, 1977

Related U.S. Application Data

[62] Division of Ser. No. 705,116, July 14, 1976.

[51] Int. Cl.$^2$ .............................................. C08J 9/06
[52] U.S. Cl. ................................. 260/823; 260/2 P; 260/2.5 FP; 260/2.5 R; 260/23 R; 260/47 P; 260/47 UA; 260/874
[58] Field of Search .................... 260/823, 2 P, 47 P, 260/2.5 FP, 2.5 R

[56] References Cited

U.S. PATENT DOCUMENTS

| | | | |
|---|---|---|---|
| 3,856,712 | 12/1974 | Reynard et al. | 260/2 P |
| 3,856,713 | 12/1974 | Rose et al. | 260/2 P |

*Primary Examiner*—Morton Foelak

[57] ABSTRACT

Polyphosphazene blends and foams thereof are described. The blends comprise of at least one polyphosphazene copolymer having a Young's Modulus of up to about $5 \times 10^8$ dynes/cm$^2$ and at least one polyphosphazene homopolymer or copolymer having a Young's Modulus of at least about $5 \times 10^8$ dynes/cm$^2$. The copolymers used to prepare the blends comprise randomly repeating units represented by the formulas

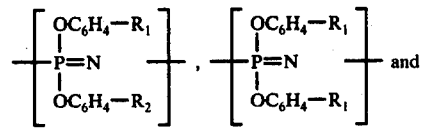 , and

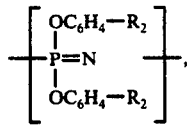

, wherein $R_1$ and $R_2$ are the same or different and are hydrogen, a $C_1$–$C_{10}$ linear or branched alkyl radical, or a $C_1$–$C_4$ linear or branched alkoxy radical substituted on any sterically permissible position on the phenoxy group, with the proviso that when $R_2$ is alkoxy, $R_1$ and $R_2$ are different. The blends of this invention can be formed into sheets or films, or into flexible or semi-rigid foams. The blends are extremely fire retardant and produce low smoke loads, or essentially no smoke, when heated in an open flame.

5 Claims, No Drawings

POLYPHOSPHAZENE BLENDS

CROSS-REFERENCE TO RELATED APPLICATION

This is a division, of application Ser. No. 705,116, filed July 14, 1976.

DESCRIPTION OF THE INVENTION

This invention relates to blends of polyphosphazene homopolymers and copolymers, to flexible and semirigid foams produced from said blends, and to a process for preparing said blends and foams. The blends of this invention exhibit excellent flame retardant and film-forming properties. Foams prepared from the blends exhibit excellent flame retardant properties and produce low smoke levels, or essentially no smoke, when heated in an open flame.

The preparation of polyphosphazene polymers has been disclosed in U.S. Pat. Nos. 3,370,020 to Allcock et al., 3,856,712 to Reynard et al., 3,856,713 to Rose et al.; and 3,883,451 to Reynard et al. Similarly, the concept of blending phosphazene-epoxy prepolymers with organic liquid prepolymers such as phenolics, epoxies, polyurethanes and polyesters, and subsequently curing such blends is disclosed in U.S. Pat. No. 3,867,344 to Frank et al. However, the products produced by the methods of the prior art have widely varying physical characteristics which, in many cases, limit their utility, particularly when it is desired to prepare flexible or semirigid foams.

We have now found that products, particularly films and foams, having tailored, highly desirable physical characteristics may be prepared by blending two or more polyphosphazene homopolymers or copolymers having widely differing degrees of elasticity. That is to say, we have discovered that films and foams having a predetermined degree of flexibility, and exhibiting excellent flame retardant and smoke properties, may be prepared by blending at least one relatively elastomeric polyphosphazene copolymer having a Young's Storage Modulus of up to about $5 \times 10^8$ dynes/cm$^2$ with at least one relatively stiff or rigid polyphosphazene homopolymer or copolymer having a Young's Modulus of at least about $5 \times 10^8$ dynes/cm$^2$. The ratio of the relatively elastomeric polymer to the relatively stiff polymer may vary over a wide range, with ratios in the range of from about 1:3 to about 3:1 being preferred.

The polyphosphazene polymers used to prepare the blends of this invention comprise randomly repeating units represented by the formulas

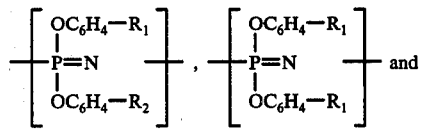

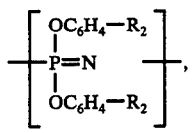

wherein $R_1$ and $R_2$ are the same or different and are hydrogen, a $C_1$-$C_{10}$ linear or branched alkyl radical, or a $C_1$-$C_4$ linear or branched alkoxy radical substituted on any sterically permissible position on the phenoxy group, with the proviso that when $R_2$ is alkoxy and when copolymers are to be prepared, $R_1$ and $R_2$ are different. Examples of $R_1$ and $R_2$ include ethoxy, methoxy, isopropoxy, n-butoxy, methyl, ethyl, n-propyl, isopropyl, sec-butyl, tert-butyl, tert-pentyl, 2-ethyl-hexyl and n-nonyl.

It is to be understood that when $R_1$ is the same as $R_2$, homopolymers are formed. Further, it is to be understood that while it is presently preferred that all $R_1$'s are the same and all $R_2$'s are the same, the $R_1$'s can be mixed and the $R_2$'s can be mixed. The mixtures may be mixtures of different alkyl radicals or mixtures of different ortho-, meta- and para- isomers. One skilled in the art readily will recognize that steric hindrance will dictate the propriety of using relatively bulky groups in the para-position on the phenoxy ring since as set forth hereinafter the polymers are made by reacting a substituted metal phenoxide with a chlorine atom on a phosphorous atom. Desirably, groups which sterically inhibit this reaction should be avoided. Absent the foregoing proviso, the selection of the various $R_1$'s and $R_2$'s will be apparent to anyone skilled in the art based upon this disclosure.

For the sake of simplicity, the polymers used to prepare the blends of the invention which contain the above three repeating units may be represented by the formula [NP $(OC_6H_4-R_1)_a(OC_6H_4-R_2)_b]_n$, wherein $n$ is from about 20 to about 2000 or more, and wherein $a$ and $b$ are greater than zero and $a+b=2$.

The above described polymers, as well as those containing reactive sites designated as W below, may be crosslinked and/or cured at moderate temperatures (for example, 200°–350° F.) by the use of free radical initiators, for example, peroxides, using conventional amounts, techniques and processing equipment.

The copolymers used to prepare the blends of this invention may contain small amounts of randomly distributed repeating units in addition to the repeating units described above. Examples of these additional repeating units are:

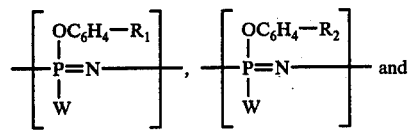

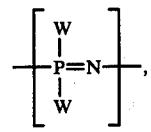

wherein W represents a group capable of a crosslinking chemical reaction, such as, an olefinically unsaturated, preferably ethylenically unsaturated monovalent radical, containing a group capable of further reaction at relatively moderate temperatures, and the ratio of W:[(—OC$_6$H$_4$—R$_1$)+(—OC$_6$H$_4$—R$_2$)] is less than about 1:5. For the sake of simplicity, the copolymers which are further reactive may be represented by the formula [NP(OC$_6$H$_4$—R$_1$)$_a$(OC$_6$H$_4$—R$_2$)$_b$(W)$_c$]$_n$, wherein W, R$_1$, R$_2$, $n$, $a$ and $b$ are as set forth above, and wherein $a+b+c=2$. Examples of W are —OCH=CH$_2$; —OR$_3$CH=CH$_2$;

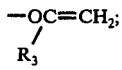

$OR_3CF=CF_2$ and similar groups which contain unsaturation, where $R_3$ is any aliphatic or aromatic radical, especially $-CH_2-$. These groups are capable of further reaction at moderate temperatures (for example, 200°–350° F.) in the presence of free radical initiators, conventional sulfur curing or vulcanizing additives known in the rubber art or other reagents, often even in the absence of accelerators, using conventional amounts, techniques and processing equipment.

Examples of free radical initiators include benzoyl peroxide, bis(2,4-dichlorobenzoyl peroxide), di-tert-butyl peroxide, dicumyl peroxide, 2,5-dimethyl (2,5-di-tert-butylperoxy) hexane, t-butyl perbenzoate, 2,5-dimethyl-2,5-di(tert-butyl peroxy) heptyne, and 1,1-bis (tert-butylperoxy)-3,3,5-trimethylcyclohexane. Thus, the general peroxide classes which may be used for crosslinking include diacyl peroxides, peroxyesters, and dialkyl peroxides.

Examples of sulfur-type curing systems include vulcanizing agents such as sulfur, sulfur monochloride, selenium, tellurium, thuiram disulfides, p-quinone dioximes, polysulfide polymers, and alkyl phenol sulfides. The above vulcanizing agents may be used in conjunction with accelerators, such as aldehyde amines, thio carbamates, thiuram sulfides, guanidines, and thiazols, and accelerator activators, such as zinc oxide or fatty acids, e.g., stearic acid.

It is also possible to use as W in the above formulas, monovalent radicals represented by the formulas (1) $-OSi(OR^4)_2R^5$ and other similar radicals which contain one or more reactive groups attached to silicon; (2) $-OR^6NR^6H$ and other radicals which contain reactive $-NH$ linkages. In these radicals $R^4$, $R^5$ and $R^6$ each represent aliphatic, aromatic and acyl radicals. Like the groups above, these groups are capable of further reaction at moderate temperatures in the presence of compounds which effect crosslinking. The presence of a catalyst to achieve a cure is often desirable. The introduction of groups such as W into polyphosphazene polymers is shown in U.S. Pat. Nos. 3,888,799; 3,702,833 and 3,844,983, which are hereby incorporated by reference. It is contemplated that the copolymers used to prepare the blends of this invention contain a mole ratio of a:b of at least about 1:6 and up to 6:1, and preferably between about 1:4 and 4:1. It is also contemplated that the mole ratio of c:(a+b) will be less than about 1:5, preferably from about 1:50 to about In one embodiment, the polymers used to prepare the blends of this invention may be prepared in accordance with the process described in our copending application Ser. No. 661,862, filed Feb. 27, 1976, which description is incorporated herein by reference. Accordingly, the polymers which may be used to prepare the blends of this invention may be prepared by a multistep process wherein the first step comprises thermally polymerizing a compound having the formula $(NPCl_2)_3$ by heating it at a temperature and for a length of time ranging from about 200° C. for 48 hours to 300° C. for 30 minutes, preferably in the absence of oxygen, and most preferably in the presence of a vacuum of at least $10^{-1}$ Torr. That is to say, the compounds are heated to a temperature ranging from about 200° C. to about 300° C. for from about 30 minutes to 48 hours, the higher temperatures necessitating shorter contact times and the lower temperatures necessitating longer contact times. The compounds must be heated for such a length of time that only a minor amount of unreacted charge material remains and a major amount of high polymer has been produced. Such a result is generally achieved by following the conditions of temperature and contact time specified above.

It is preferred that the thermal polymerization be carried out in the presence of an inert gas such as nitrogen, neon, argon or a vacuum, e.g., less than about $10^{-1}$ Torr inasmuch as the reaction proceeds very slowly in the presence of air. The use of such gas, however, is not critical.

The polymers resulting from the thermal polymerization portion of the process are in the form of a polymeric mixture of different polymers of different chain lengths. That is to say, the product of the thermal polymerization is a mixture of polymers having the formula $-(NPCl_2)_n-$ wherein $n$ ranges from about 20 to about 2000. For example, the recovered media may contain minor amounts of a polymer where $n$ is 20 and major amounts of polymer where $n$ is 2000. The media may also contain polymers composed of from 21-1999 recurring units and some unreacted trimer. The complete mixture of polymers and unreacted trimer constitutes the charge to the second step of the process.

When homopolymers are to be prepared, the second or esterification step of the process comprises treating the mixture resulting from the thermal polymerization step with a compound having the formula $M(OC_6H_4-R_2)_x$ wherein M is lithium, sodium, potassium, magnesium or calcium, $x$ is equal to the valence of metal M, and $R_2$ is as specified above.

Similarly, when copolymers are to be prepared, the second or esterification step comprises treating the mixture resulting from the thermal polymerization step with a mixture of compounds having the formulas $M(OC_6H_4-R_1)_x$ $M(OC_6H_4-R_2)_x$ and, if desired, $M(W)_x$ wherein M, x, $R_1$, $R_2$ and W are as specified above, with the proviso that when $R_2$ is alkoxy, $R_2$ and $R_1$ are different.

Regardless of whether homopolymers or copolymers are being prepared, the polymer mixture is reacted with the above described metal compound or mixture of metal compounds at a temperature and a length of time ranging from about 25° C. for 7 days to about 200° C. for 3 hours.

Again, as in regard to the polymerization step mentioned above, the polymer mixture is reacted with the alkali or alkaline earth metal compounds at a temperature ranging from about 25° C. to about 200° C. for from about 3 hours to 7 days, the lower temperatures necessitating the longer reaction times and the higher temperatures allowing shorter reaction times. These conditions are, of course, utilized in order to obtain the most complete reaction possible, i.e., in order to insure the complete conversion of the chlorine atoms in the polymer mixture to the corresponding ester of the alkali or alkaline earth starting materials.

The above esterification step is carried out in the presence of a solvent. The solvent employed in the esterification step must have a relatively high boiling point (e.g., about 115° C., or higher) and should be a solvent for both the polymer and the alkali or alkaline earth metal compounds. In addition, the solvent must be substantially anhydrous, i.e., there must be no more water in the solvent or metal compounds than will result in more than 1%, by weight, of water in the reaction mixture. The prevention of water in the system is necessary in order to inhibit the reaction of the available chlorine atoms in the polymer therewith. Examples of suitable solvents include diglyme, triglyme, tetraglyme, toluene and xylene. The amount of solvent employed is not critical and any amount sufficient to solubilize the chloride polymer mixture can be employed. Either the polymer mixture or the alkaline earth (or alkali) metal compounds may be used as a solvent solution thereof in an inert, organic solvent. It is preferred, however, that at least one of the charge materials be used as a solution in a compound which is a solvent for the polymeric mixture.

The amount of the alkali metal or alkaline earth metal compound employed or the combined amount of the mixture of said compounds employed when copolymers are being prepared should be at least molecularly equivalent to the number of available chlorine atoms in the polymer mixture. However, it is preferred that an excess of the metal compounds be employed in order to assure complete reaction of all the available chlorine atoms. Generally, the ratio of the individual alkali metal or alkaline earth metal compounds in the combined mixture governs the ratio of the groups attached to the polymer backbone. However, those skilled in the art readily will appreciate that the nature and, more particularly, the steric configuration of the metal compounds employed may affect their relative reactivity. Accordingly, when preparing copolymers, the ratio of $R_1$'s and $R_2$'s in the esterified product, if necessary, may be controlled by employing a stoichiometric excess of the slower reacting metal compound.

Examples of alkali or alkaline earth metal compounds which are useful in the process of the present invention include sodium phenoxide
potassium phenoxide
sodium p-methoxyphenoxide
sodium o-methoxyphenoxide
sodium m-methoxyphenoxide
lithium p-methoxyphenoxide
lithium o-methoxyphenoxide
lithium m-methoxyphenoxide
potassium p-methoxyphenoxide
potassium o-methoxyphenoxide
potassium m-methoxyphenoxide
magnesium p-methoxyphenoxide
magnesium o-methoxyphenoxide
magnesium m-methoxyphenoxide
calcium p-methoxyphenoxide
calcium o-methoxyphenoxide
calcium m-methoxyphenoxide
sodium p-ethoxyphenoxide
sodium o-ethoxyphenoxide
sodium m-ethoxyphenoxide
potassium p-ethoxyphenoxide
potassium o-ethoxyphenoxide
potassium m-ethoxyphenoxide
sodium p-n-butoxyphenoxide
sodium m-n-butoxyphenoxide
lithium p-n-butoxyphenoxide
lithium m-n-butoxyphenoxide
potassium p-n-butoxyphenoxide
potassium m-n-butoxyphenoxide
magnesium p-n-butoxyphenoxide
magnesium m-n-butoxyphenoxide
calcium p-n-butoxyphenoxide
calcium m-n-butoxyphenoxide
sodium p-n-propoxyphenoxide
sodium o-n-propoxyphenoxide
sodium m-n-propoxyphenoxide
potassium p-n-propoxyphenoxide
potassium o-n-propoxyphenoxide
potassium m-n-propoxyphenoxide
sodium p-methylphenoxide
sodium o-methylphenoxide
sodium m-methylphenoxide
lithium p-methylphenoxide
lithium o-methylphenoxide
lithium m-methylphenoxide
sodium p-ethylphenoxide
sodium o-ethylphenoxide
sodium m-ethylphenoxide
potassium p-n-propylphenoxide
potassium o-n-propylphenoxide
potassium m-n-propylphenoxide
magnesium p-n-propylphenoxide
sodium p-isopropylphenoxide
sodium o-isopropylphenoxide
sodium m-isopropylphenoxide
calcium p-isopropylphenoxide
calcium o-isopropylphenoxide
calcium m-isopropylphenoxide
sodium p-sec butylphenoxide
sodium m-sec butylphenoxide
lithium p-sec butylphenoxide
lithium m-sec butylphenoxide
lithium p-tert. butylphenoxide
lithium m-tert. butylphenoxide
potassium p-tert. butylphenoxide
potassium m-tert. butylphenoxide
sodium p-tert. butylphenoxide
sodium m-tert. butylphenoxide
sodium propeneoxide
sodium p-nonylphenoxide
sodium m-nonylphenoxide
sodium o-nonylphenoxide
sodium 2-methyl-2-propeneoxide
potassium buteneoxide and the like.

The second step of the process results in the production of a homopolymer mixture having the formula $$\pm NP(OC_6H_4-R_2)\frac{1}{n}$$

or a copolymer mixture having the formula

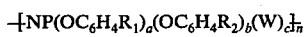

wherein $n$, $R_1$, $R_2$ and W are as specified above, where $c$, but not $a$ and $b$ can be zero, and where $a+b+c=2$, and the corresponding metal chloride salt.

The polymeric reaction mixture resulting from the second or esterification step is then treated to remove the salt which results upon reaction of the chlorine atoms of the polymer mixture with the metal of the alkali or alkaline earth metal compounds. The salt can be removed by merely precipitating it out and filtering, or it may be removed by any other applicable method, such as by washing the reaction mixture with water after neutralization thereof with, for example, an acid such as hydrochloric acid.

The next step in the process comprises fractionally precipitating the polymeric material to separate out the high polymer from the low polymer and any unreacted trimer. The fractional precipitation is achieved by the, preferably dropwise, addition of the esterified polymer mixture to a material which is a non-solvent for the high polymer and a solvent for the low polymer and unreacted trimer. That is to say, any material which is a non-solvent for the polymers wherein $n$ is higher than 350 and a solvent for the remaining low polymers may be used to fractionally precipitate the desired polymers. Examples of materials which can be used for this purpose include hexane, diethyl ether, carbon tetrachloride, chloroform, dioxane, methanol, water and the like. The fractional precipitation of the esterified polymeric mixture generally should be carried out at least twice and preferably at least four times in order to remove as much of the low polymer from the polymer mixture as possible. The precipitation may be conducted at any temperature, however, it is preferred that room temperature be employed. The high molecular weight polymer mixture may then be recovered by filtration, centrifugation, decantation or the like.

The homopolymers and copolymers prepared in accordance with the above described process are thermally stable. They are soluble in specific organic solvents such as tetrahydrofuran, benzene, xylene, toluene, dimethylformamide and the like and can be formed into films from solutions of the polymers by evaporation of the solvent. The polymers are water resistant at room temperature and do not undergo hydrolysis. However, the elasticity of the various polymers varies greatly, such that many of the polymers can not be worked into useful forms. This undesirable characteristic can be overcome by blending at least one of the above polymers having a Young's Storage Modulus in the range of $1 \times 10^6$ to $5 \times 10^8$ dynes/cm$^2$, preferably $4 \times 10^6$ to $7 \times 10^7$ dynes/cm$^2$ with at least one of the above polymers having a Young's Modulus in the range of $5 \times 10^8$ to $6 \times 10^{10}$ dynes/cm$^2$, preferably $2.45 \times 10^9$ to $2.61 \times 10^{10}$ dynes/cm$^2$, at a blend ratio of from about 1:3 to 3:1. The resulting blends are characterized by a Young's Modulus between the values of their relatively elastomeric and stiff components. The blends may be used to prepare films, fibers, coatings, molding compositions and the like. Additionally, the blends may be used to prepare foamed products which exhibit excellent fire retardance and which produce low smoke levels, or essentially no smoke when heated in an open flame. The foamed products may be prepared from filled or unfilled formulations using conventional foam techniques with chemical blowing agents, i.e. chemical compounds stable at original room temperature which decompose or interact at elevated temperatures to provide a cellular foam. Suitable chemical blowing agents include:

| Blowing Agent | Effective Temperature Range ° C. |
|---|---|
| Azobisisobutyronitrile | 105–120 |
| Azo dicarbonamide (1,1-azobisform-amide) | 100–200 |
| Benzenesulfonyl hydrazide | 95–100 |
| N,N'-dinitroso-N,N'-dimethyl tere-phthalamide | 65–130 |
| Dinitrosopentamethylenetetramine | 130–150 |
| Ammonium carbonate | 58 |
| p,p'-oxybis-(benzenesulfonyl-hydrazide) | 100–200 |
| Diazo aminobenzene | 84 |
| Urea-biuret mixture | 90–140 |
| 2,2'-axo-isobutyronitrile | 90–140 |
| Azo hexahydrobenzonitrile | 90–140 |
| Diisobutylene | 103 |
| 4,4'-diphenyl disulfonylazide | 110–130. |
| Typical foamable formulations include: | |
| Polyphosphazene elastomer | 50 parts |
| Polyphosphazene nonelastomer | 50 parts |
| Filler (e.g., alumina trihydrate) | 0–100 phr |
| Stabilizer (e.g., magensium oxide) | 2.5–10 phr |
| Processing aid (e.g., zinc stearate) | 2.5–10 phr |
| Plasticizer resin (e.g., Cumar P-10, coumarone indene resin) | 0–50 phr |
| Blowing agent (e.g., 1.1'-azobisformamide) | 10–50 phr |
| Activator (e.g., oil-treated urea) | 10–40 phr |
| Peroxide curing agent (e.g., 2,5-dimethyl-2,5-di(t-butylperoxy) hexane) | 2.5–10 phr |
| Peroxide curing agent (e.g., benzoyl peroxide) | 2.5–10 phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 120°–140° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy) hexane, and partially pre-curing in a closed mold for about 6–30 minutes at 200°–250° F., followed by free expansion for 30–60 minutes at 300°–350° F. In the alternative, the foaming may be accomplished ny heating the foamable mass for 30–60 minutes at 300°–350° F. using a high temperature or low temperature curing agent, either singly or in combination. One benefit of utilizing the "partial pre-cure" foaming technique is that an increase in the molecular weight of the foamable polymer prior to the foaming step enables better control of pore size and pore uniformity in the foaming step. The extent of "pre-cure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally light tan to yellowish in appearance, and vary from flexible to semirigid, depending upon the relative amounts and the Young's Modulus of the elastomeric and nonelastomeric polymers employed in the foam formulation. As indicated, inert, reinforcing or other fillers such as alumina trihydrate, hydrated silicas or calcium carbonate can be added to the foams and the presence of these and other conventional additives should in no way be construed as falling outside the scope of this invention.

Also, as mentioned above, the blends of this invention can be crosslinked at moderate temperatures by conventional free radical and/or sulfur curing techniques when minor amounts of unsaturated groups W are present in the copolymer backbone. The ability of these blends to be cured at temperatures below about 350° F. makes them particularly useful as potting and encapsulation compounds, sealants, coatings and the like. These blends are also useful for preparing crosslinked foams which exhibit significantly increased tensile strengths over uncured foams. These blends are often crosslinked in the presence of inert, reinforcing or other fillers and the presence of these and other conventional additives are deemed to be within the scope of this invention.

The following examples are set forth for purposes of illustration only and are not to be construed as limitations of the present invention except as set forth in the appended claims. All parts and percentages are by weight unless otherwise indicated.

EXAMPLE 1

Preparation of $-(NPCl_2)_n$ 250 parts of phosphonitrilic chloride trimer, previously recrystallized from n-heptane, were degassed and sealed in a suitable, thick-walled reaction vessel at $10^{-2}$ Torr and heated to 250° C. for 6 hours. Polymerization was terminated at this time since a glass ball, one-half inch in diameter ceased to flow due to the increased viscosity of the molten mass, when the vessel was inverted. Termination was effected by cooling the vessel to room temperature. The resulting polymeric mixture was then dissolved in toluene to form an anhydrous solution.

EXAMPLE 2

Preparation of $[NP(OC_6H_4-4-sec\ C_4H_9)(OC_6H_5)]_n$

The anhydrous toluene solution of poly poly(dichlorophosphazene) formed in Example 1, containing 0.97 equivalents of poly(dichlorophosphazene), was added to an anhydrous diglymebenzene solution of 0.62 equivalents of $NaOC_6H_4$—sec $C_4$—$H_9$ and 0.62 equivalents of $NaOC_6H_5$ at a temperature of 95° C. with constant stirring. After the addition, benzene was distilled from the reaction mixture until a temperature of 115°–116° C. was attained. The reaction was then heated at reflux for 60–65 hours. At the end of this time the copolymer was precipitated by pouring the reaction mixture into an excess of methyl alcohol. The polymer was stirred in the methyl alcohol for 24 hours. Next, it was added to a large excess of water and stirred for an additional 24 hours. The resulting product (up to 62 per cent yield) was an elastomeric solid having a glass transition temperature (Tg) of −8.1° C. and a Young's Storage Modulus of $1 \times 10^7$ dyne/cm$^2$. The Young's Modulus was determined using a Rheovibron tensile tester (Toyo Measuring Instrument Co., E. A. Tolle Co., Hingham, Mass.) which measures the dynamic tensile modulus by oscillating a sample in tension. The product was soluble in benzene, tetrahydrofuran and dimethylformamide. The copolymer mixture was then cast to a tough, transparent film from solution in tetrahydrofuran. The film was flexible, did not burn, and was water-repellant. The copolymer had an Oxygen Index (OI) of 25.9 as determined according to the procedure described in ASTM D-2863-74, "Flammability of Plastics Using the Oxygen Index Method". By this method, material samples, which are 6 × 2 × 0.01 to 0.03 inches, are held in a U-shaped frame and the burning of the samples under a specific set of conditions is measured. It has been shown that this technique actually measures the lowest oxygen concentration in an atmosphere which will just prevent sustained burning of a top-ignited sample (see Fenimore et. al, Combustion and Flame, 10, 135 (1966)). The oxygen index values also have been related to the temperature at which a mixture of fuel and a controlled flow of oxygen will just burn when the fuel is composed of volatile pyrolytic products or fragments (see, Johnson et al., Rubber Age, 107 (No. 5), 29 (1975)). Analysis: Calculated (percent) for 1:1 copolymer of $[NP(OC_6H_4-4\text{-sec }C_4H_9)(OC_6H_5)]_n$: C, H, N, and Cl, 0.00. Found (percent): C, H. N, and Cl, 0.00

EXAMPLE 3

Polyphosphazene homopolymers and copolymers were prepared by a multistep process beginning with the thermal polymerization of hexachlorocyclotriphosphazene, $N_3P_3Cl_6$, as described in Example 1. The resulting poly(dichlorophosphazene) $[NPCl_2]_n$ was dissolved in a suitable solvent, such as toluene. This polymeric solution was then added to a bis(2-methoxyethyl) ether solution of the desired sodium aryloxide salt at 95° C. (Copolymers were prepared by adding the polymer to a solution containing a 1:1 mole ratio of the two desired sodium aryloxide salts.) The reaction temperature was raised to 115–116° C. and maintained for 50–65 hours with constant stirring. The thermal polymerization and subsequent reaction are summarized in Equations (1) and (2):

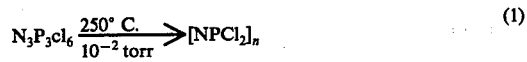

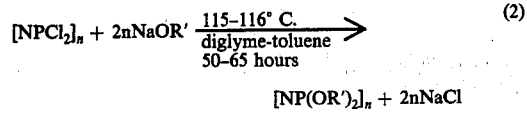

After the reaction was completed, the polymers were precipitated by pouring the reaction mixture into an excess of methanol, were washed for 24 hours in methanol, and finally were exhaustively washed with distilled water. The polymers ranged from rigid fiber-like materials to elastomers and, except for a few cases, were colorless. The polymers prepared, their glass-transition temperatures and their Young's Modulus are listed in Table I. Analytical data were in agreement with the tabulated empirical formulas.

TABLE 1

GLASS TRANSITION TEMPERATURES* AND YOUNG'S MODULUS** OF POLYPHOSPHAZENE POLYMERS

| | $[NP(OR')(OR'')]_n$ | Tg. °C. | Young's Modulus dynes/cm$^2$ |
|---|---|---|---|
| R'=C$_6$H$_5$ | R" = C$_6$H$_4$-4-secC$_4$H$_9$ | −8.1 | $1 \times 10^7$ |
| C$_6$H$_5$ | C$_6$H$_4$-C$_6$H$_9$ | — | $5 \times 10^{6a}$ |
| C$_6$H$_4$-4-OCH$_3$ | C$_6$H$_4$-4-secC$_4$H$_9$ | −5.03 | $7 \times 10^7$ |
| C$_6$H$_4$-4-OCH$_3$ | C$_6$H$_4$-4-C$_9$H$_{19}$ | −2.23. | $4 \times 10^{6a}$ |

TABLE 1-continued

GLASS TRANSITION TEMPERATURES*
AND YOUNG'S MODULUS**
OF POLYPHOSPHAZENE POLYMERS

| [NP(OR')(OR")]$_n$ | | Tg. °C. | Young's Modulus dynes/cm$^2$ |
|---|---|---|---|
| $C_6H_5$ | $C_6H_5$ | −7.7 | $7.3 \times 10^9$ |
| $C_6H_4$-4-$CH_3$ | $C_6H_4$-4-$CH_3$ | +2.0 | $2.99 \times 10^9$ |
| $C_6H_4$-4-iso$C_3H_7$ | $C_6H_4$-4-iso$C_3H_7$ | −0.10 | $7.38 \times 10^9$ |
| $C_6H_4$-4-tert$C_4H_9$ | $C_6H_4$-4-tert$C_4H_9$ | +44 | $2.61 \times 10^{10}$ |
| $C_6H_4$-4-$OCH_3$ | $C_6H_4$-4-$OCH_3$ | +0.60 | $5.0 \times 10^9$ |
| $C_6H_5$ | $C_6H_4$-4-tert$C_4H_9$ | +22 | $2.45 \times 10^9$ |
| $C_6H_4$-4-$OCH_3$ | $C_6H_4$-4-tert$C_4H_9$ | +24.1 | $5.04 \times 10^9$ |

*Determined by differential scanning calorimetry. The above values are based on Indium standard (melt temperature 156.6° C.)
**Determined by Rheovibron instrument, 110 Hertz, 22° C.
°Estimated, sample too elastomeric for accurate measurement.

The polymers set forth in Table 1 having a Young's Modulus from $7 \times 10^7$ dynes/cm$^2$ and below were elastomers, whereas the polymers having a Young's Modulus of $2.45 \times 10^9$ dynes/cm$^2$ and above were rigid or nonelastomeric fiber-like materials. The nonelastomeric materials exhibited excellent fire retardant and smoke properties, but they could not be sheeted or formed into foamed articles.

EXAMPLE 4

Various 1:1 blends were prepared from the elastomeric and nonelastomeric polymers set forth in Table 1. The blends were prepared using a two roll research mill with one roll heated to approximately 120°–140° F. and the other at ambient conditions. The specific polymers blended, the glass transition temperature of the blends, and the Young's Modulus of the blends are set forth in Table 2.

TABLE 2

GLASS TRANSITION TEMPERATURE*
AND YOUNG'S MODULUS**
OF POLYPHOSPHAZENE POLYMER BLENDS

| Polymers Blended 1:1 Mole Ratio | Tg° C. | Young's Modulus dyne/cm$^2$ |
|---|---|---|
| [NP(OC$_6$H$_5$)(OC$_6$H$_4$-sec C$_4$H$_9$)]$_n$/ [NP(OC$_6$H$_4$-4-iso C$_3$H$_7$)$_2$]$_n$ | −5 | $4.8 \times 10^8$ |
| [NP(OC$_6$H$_5$)(OC$_6$H$_4$-sec C$_4$H$_9$)]$_n$/ [NP(OC$_6$H$_5$)(OC$_6$H$_4$-4-tert C$_4$H$_9$)]$_n$ | +15 | $1.58 \times 10^9$ |
| [NP(OC$_6$H$_5$)(OC$_6$H$_4$-sec C$_4$H$_9$)]$_n$/ [NP(OC$_6$H$_4$-4-OCH$_3$)(OC$_6$H$_4$-4-tert C$_4$H$_9$)]$_n$ | +20 | $3.67 \times 10^9$ |
| [NP(OC$_6$H$_4$-4-OCH$_3$) (OC$_6$H$_4$-4-sec C$_4$H$_9$)]$_n$/ [NP(OC$_6$H$_4$-4-iso C$_3$H$_7$)$_2$]$_n$ | −5 | $5.2 \times 10^8$ |
| [NP(OC$_6$H$_4$-4-OCH$_3$)(OC$_6$H$_4$-4-sec C$_4$H$_9$)]$_n$/ [NP(OC$_6$H$_5$)(OC$_6$H$_4$-4-tert C$_4$H$_9$)]$_n$ | +11 | $1.60 \times 10^9$ |
| [NP(OC$_6$H$_4$-4-OCH$_3$)(OC$_6$H$_4$-4-sec C$_4$H$_9$)]$_n$/ [NP(CO$_6$H$_4$-4-OCH$_3$)(OC$_6$H$_4$-4-tert C$_4$H$_9$)]$_n$ | +15 | $1.75 \times 10^9$ |

*Determined by differential scanning calorimetry. The above values are based on Indium standard (melt temperature 156.6° C.)
**Determined by Rheovibron Instrument, 110 Hertz, 22° C.

The glass transition temperature data in Table 2 indicates that the polymer blends approach true solutions, i.e., instead of two separate glass transition temperatures, only one broad glass transition is observed. The Young's Modulus of each blend is between the value of either component from which the respective blends are prepared. Each blend is less elastomeric than its elastomeric component, but more elastomeric than its stiff or nonelastomeric component. Each blend is capable of being worked into a sheet or film, and each blend can be foamed.

EXAMPLE 5

Foams of filled polyphosphazene blends were prepared by blending the polymer portion of the "standard foam recipe" on a two roll research mill with one roll heated to 120°–140° F. and the other at ambient conditions. The polymers were blended for 15 minutes to insure homogeneous mixing, whereafter the remaining ingredients of the "standard foam recipe" were added to the polymer blend on the research mill. Mixing was continued for another 15 minutes to form an unexpanded blend. The unexpanded blend was then precured in a press for 12 minutes at a temperature of 220° F and a pressure of 2000 p.s.i. to form a precured pad. Finally, the precured pad was free expanded in a circulating air oven for 30 minutes at 300° F. The "standard foam recipe" is set forth in Table 3.

TABLE 3

STANDARD FOAM RECIPE

| Ingredient | Amount, gm |
|---|---|
| Polyphosphazene Elastomer | 5g |
| Polyphosphazene Nonelastomer | 5g |
| Alumina Trihydrate | 10g |
| 1,1'-Azo Bisformamide | 2g |
| BIK-OT$^a$ | 0.5g |
| Magnesium Oxide | 0.5g |
| Zinc Stearate | 1.0g |
| Cumar$^b$ | 0.2g |
| 2,5-Dimethyl-2,5-Ditertiary Peroxy Hexane | 0.6g |
| Benzoyl Peroxide (78% Active) | 0.2g |
| Dicumyl Peroxide | 0.1g |

$^a$UniRoyal Oil-Treated Urea (Activator)
$^b$Allied Chemical p-Coumarone-Indene Resin

EXAMPLES 6–15

Using the method and the recipe set forth in Example 5, the polymers indicated in Table 4 were formed into foamed pads. The pads were die-cut to $3 \times 3 \times 0.02$–.03 inches and were conditioned for 48 hours at 73° F. and 50% relative humidity prior to testing for smoke evolution properties. The smoke evolution properties of the samples were evaluated by using an Aminco-NBS Smoke Density Chamber (Model 4-5800, Aminco-NBS Smoke Density Chamber, American Instrument Co.), as described by Gross et al., "A Method of Measuring Smoke Density from Burning Materials", ASTM STP-422 (1967). Samples were tested using the flaming test mode. This small scale test subjects a sample to the general conditions which prevail in the majority of "real" fires and especially in tunnel tests. In the tests the maximum specific optical density Dm, corrected for soot deposits on the cell windows was measured, and a smoke value per gram, SV/g, or Dm(corr)/g of sample was calculated. This allows for correction of the smoke density value for its sample weight, since the samples are quite thin. Generally, NBS smoke values of 450 or less are normally required in those fire or code regulations restricting smoke evolution. Values of 200 or less are uncommon for most organic polymers; those less than 100 are quite rare. The smoke properties of the polymer blends are set forth in Table 4, along with the smoke properties of several commercial polymers. The density and relative flexibility of the polymer blend foams are set forth in Table 5.

TABLE 4

NBS SMOKE DENSITY TEST results
POLYPHOSPHAZENE BLENDS AND REFERENCE POLYMERS

| Example No. | Reference Polymer | Flaming Mode (F) Dm(corr) | SV/g |
|---|---|---|---|
|  | Polyethylene | 150 | — |
|  | Polystyrene | 468 | — |
|  | Poly(vinyl chloride) | 530 | — |
|  | Polycarbonate | 660 | — |
|  | ABS-Rubber | 180 | — |
|  | Silicone Rubber (GE-SE9035) | 385 | — |
| 6 | $[NP(OC_6H_5)(OC_6H_4\text{-}4\text{-sec }C_4H_9)]_n/$ $[NP(OC_6H_4\text{-}4\text{-iso }C_3H_7)_2]_n$ | 185 | 10 |
| 7 | $[NP(OC_6H_5)(OC_6H_4\text{-}4\text{-sec }C_4H_9)]_n/$ $[NP(OC_6H_5)(OC_6H_4\text{-}4\text{-tert }C_4H_9)]_n$ | 109 | 15 |
| 8 | $[NP(OC_6H_5)(OC_6H_4\text{-}4\text{-sec }C_4H_9)]_n/$ $NP(OC_6H_4\text{-}4\text{-OCH}_3)(OC_6H_4\text{-tert }C_4H_9)]_n$ | 163 | 36 |
| 9 | $[NP(OC_6H_5)(OC_6H_4\text{-}4\text{-}C_9H_{19})]_n/$ $[NP(OC_6H_4\text{-}4\text{-iso }C_3H_7)_2]_n$ | 109 | 8 |
| 10 | $[NP(OC_6H_4\text{-}4\text{-OCH}_3)(OC_6H_4\text{-}4\text{-sec }C_4H_9)]_n/$ $[NP(OC_6H_4\text{-}4\text{-iso }C_3H_7)_2]_n$ | 95 | 7 |
| 11 | $[NP(OC_6H_4\text{-}4\text{-OCH}_3)(OC_6H_4\text{-}4\text{-sec }C_4H_9)]_n/$ $[NP(OC_6H_5)(OC_6H_4\text{-}4\text{-tert }C_4H_9)]_n$ | 231 | 14 |
| 12 | $[NP(OC_6H_4\text{-}4\text{-OCH}_3)(OC_6H_4\text{-}4\text{-sec }C_4H_9)]_n/$ $[NP(OC_6H_4\text{-}4\text{-OCH}_3)(OC_6H_4\text{-}4\text{-tert }C_4H_9)]_n$ | 116 | 14 |
| 13 | $[NP(OC_6H_4\text{-}4\text{-OCH}_3)(OC_6H_4\text{-}4\text{-}C_9H_{19})]_n/$ $[NP(OC_6H_4\text{-}4\text{-iso }C_3H_7)_2]_n$ | 118 | 8 |
| 14 | $[NP(OC_6H_5)(OC_6H_4\text{-}4\text{-sec }C_4H_9)]_n/$ $[NP(OC_6H_5)(OC_6H_4\text{-}4\text{-OCH}_3)]_n$ |  |  |
| 15 | $[NP(OC_6H_4\text{-}4\text{-OCH}_3)(OC_6H_4\text{-}4\text{-}C_9H_{19})]_n/$ $[NP(OC_6H_5)(OC_6H_4\text{-}4\text{-}C_2H_5)]_n$ | 89 | 5 |

TABLE 5

| Example No. | Polyphosphazene Blend | Density, lb/ft³ | Foam Characteristics |
|---|---|---|---|
| 6 | $[NP(OC_6H_5)(OC_6H_4\text{-}4\text{-sec }C_4H_9)]_n/$ $[NP(OC_6H_4\text{-}4\text{-iso }C_3H_7)_2]_n$ | 45 | rigid |
| 7 | $[NP(OC_6H_5)(OC_6H_4\text{-}4\text{-sec }C_4H_9)]_n/$ $[NP(OC_6H_5)(OC_6H_4\text{-}4\text{-tert }C_4H_9)]_n$ | 9 | flexible |
| 8 | $[NP(OC_6H_5)(OC_6H_4\text{-}4\text{-sec }C_4H_9)]_n/$ $[NP(OC_6H_4\text{-}4\text{-OCH}_3)(OC_6H_4\text{-tert }C_4H_9)]_n$ | 5.2 | rigid |
| 9 | $[NP(OC_6H_5)(OC_6H_4\text{-}4\text{-}C_9H_{19})]_n/$ $NP(OC_6H_4\text{-}4\text{-iso }C_3H_7)_2]_n$ | 31 | flexible |
| 10 | $[NP(OC_6H_4\text{-}4\text{-OCH}_3)(OC_6H_4\text{-}4\text{-sec }C_4H_9)]_n$ $[NP(OC_6H_4\text{-}4\text{-iso }C_3H_7)_2]_n$ | 24 | rigid |
| 11 | $[NP(OC_6H_4\text{-}4\text{-OCH}_3)(OC_6H_4\text{-}4\text{-sec }C_4H_9)]_n/$ $[NP(OC_6H_4\text{-}4\text{-iso }C_3H_7)_2]_n$ | 35 | flexible |
| 12 | $[NP(OC_6H_4\text{-}4\text{-OCH}_3)(OC_6H_4\text{-}4\text{-sec }C_4H_9)]_n/$ $[NP(OC_6H_4\text{-}4\text{-OCH}_3)(OC_6H_4\text{-}4\text{-tert }C_4H_9)]_n$ | 11 | flexible |
| 13 | $[NP(OC_6H_4\text{-}4\text{-OCH}_3)(OC_6H_4\text{-}4\text{-}C_9H_{19})]_n/$ $[NP(OC_6H_4\text{-}4\text{-iso }C_3H_7)_2]_n$ | 27.1 | flexible |
| 14 | $[NP(OC_6H_5)(OC_6H_4\text{-}4\text{-sec }C_4H_9)]_n/$ $[NP(OC_6H_5)(OC_6H_4\text{-}4\text{-OCH}_3)]_n$ | — | flexible |
| 15 | $[NP(OC_6H_4\text{-}4\text{-OCH}_3)(OC_6H_4\text{-}4\text{-}C_9H_{19})]_n/$ $[NP(OC_6H_5)(OC_6H_4\text{-}4\text{-}C_2H_5)]_n$ | — | flexible |

EXAMPLE 16

Using the method of Example 5, 4g of $[NP(OC_6H_4\text{-}4\text{-OCH}_3)(OC_6H_4\text{-}4\text{-sec }C_4H_9)]_n$ and 6g of $[NP(OC_6H_4\text{-}4\text{-iso }C_3H_7)_2]_n$ were blended, mixed with the nonpolymer ingredients, and foamed. The resulting foams were flexible and tan in color.

EXAMPLE 17

Using the method of Example 5, 3g of $[NP(OC_6H_4\text{-}4\text{-OCH}_3)(OC_6H_4\text{-sec }C_4H_9)]_n$ and 7g of $[NP(OC_6H_4\text{—}4\text{—iso }C_3H_7)_2]_n$ were blended, mixed with the nonpolymer ingredients, and foamed. The resulting foams were flexible and tan in color.

EXAMPLE 18

Using the method of Example 5, 6g of $[NP(OC_6H_4\text{—}4\text{—OCH}_3)(OC_6H_4\text{—}4\text{—sec }C_4H_9)$ and 4g of $[NP(OC_6H_4\text{—}4\text{—iso }C_3H_7)_2]_n$ were blended, mixed with the nonpolymer ingredients, and foamed. The resulting foams were flexible and tan in color.

EXAMPLE 19

Using the method of Example 5, 7g of $[NP(OC_6H_4\text{—}4\text{—OCH}_3)(OC_6H_4\text{—}4\text{—sec }C_4H_9)]_n$ and 3g of $[NP(OC_6H_4\text{—}4\text{—iso }C_3H_7)_2]_n$ were blended, mixed with the nonpolymer ingredients, and foamed. The resulting foams were flexible and tan in color.

EXAMPLE 20

Using the method of Example 5, 8g of $[NP(OC_6H_4\text{—}4\text{—OCH}_3)(OC_6H_4\text{—}4\text{—sec }C_4H_9)]_n$ and 2g of $[NP(OC_6H_4\text{—}4\text{—iso }C_2H_7)_2]_n$ were blended, mixed with the nonpolymer ingredients, and foamed. The resulting foams were flexible and tan in color.

I claim:

1. A composition comprising a blend of at least one relatively elastomeric polyphosphazene copolymer having a Young's Modulus of in the range of $1 \times 10^6$ to $5 \times 10^8$ dyne/cm² and having randomly repeating units represented by the formulas

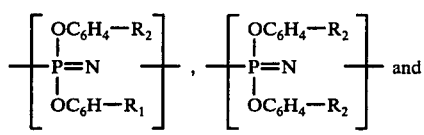 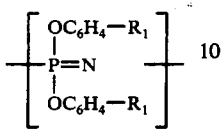 and

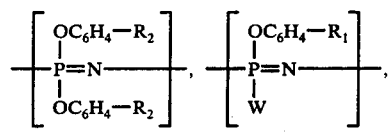

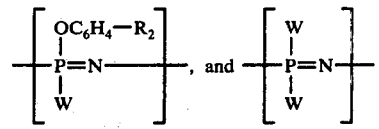

wherein $R_1$ and $R_2$ are the same or different and are hydrogen, a $C_1$–$C_{10}$ linear or branched alkyl radical, or a $C_1$–$C_4$ linear or branched alkoxy, with the proviso that when $R_2$ is alkoxy, $R_1$ and $R_2$ are different; with at least one relatively stiff or rigid polyphosphazene homopolymer or copolymer having a Young's Modulus in the range of $5 \times 10^8$ to $6 \times 10^{10}$ dynes/cm$^2$ and having randomly repeating units represented by the formulas

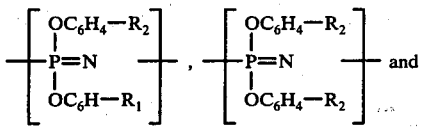 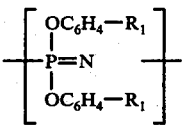 and

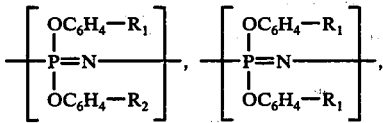

wherein $R_1$ and $R_2$ are the same or different and are hydrogen, a $C_1$–$C_{10}$ linear or branched alkyl radical, or a $C_1$–$C_4$ linear or branched alkoxy, said relatively elastomeric copolymer:relatively stiff or rigid homopolymer or copolymer being present in said blend in a ratio of from about 1:3 to about 3:1.

2. The polymer blend of claim 1, wherein at least one of said relatively elastomeric copolymer and said relatively stiff or rigid homopolymer or copolymer comprises additional randomly distributed repeating units represented by the formulas

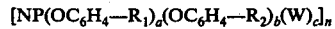

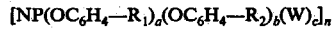

wherein W represents a monovalent radical containing a group capable of a crosslinking chemical reaction at moderate temperatures, said group being attached to a P atom by a —O— linkage; the ratio of $(OC_6H_4$—$R_1)$ : $(OC_6H_4$—$R_2)$ being from about 1:6 to about 6:1; and the ratio of W: $[OC_6H_4$—$R_1)$ + $(OC_6H_4$—$R_2)]$ being less than about 1:5.

3. A composition comprising a blend of a relatively elastomeric first polymer having the general formula $$[NP(OC_6H_4-R_1)_a(OC_6H_4-R_2)_b(W)_c]_n$$

wherein $R_1$ and $R_2$ are the same or different and are individually hydrogen, $C_1$–$C_{10}$ linear or branched alkyl or $C_1$–$C_4$ linear or branched alkoxy, with the proviso that when $R_2$ is alkoxy, $R_1$ and $R_2$ are different; W represents a monovalent radical containing a group capable of a cross-linking chemical reaction at moderate temperatures, said group being attached to a P atom by a —O— linkage; $n$ is from 20 to 2000; $c \geq o$; $a+b+c=2$; the ratio of $a:b$ is from about 1:6 to 6:1; the ratio of $c:(a+b)$ is less than about 1:5; and the Young's Modulus of said first polymer is in the range of $1 \times 10^6$ to $5 \times 10^8$ dynes/cm$^2$; with a relatively stiff or rigid second polymer having the general formula $$[NP(OC_6H_4-R_1)_a(OC_6H_4-R_2)_b(W)_c]_n$$

wherein $R_1$ and $R_2$ are the same or different and are individually hydrogen, $C_1$–$C_{10}$ linear or branched alkyl or $C_1$–$C_4$ linear or branched alkoxy; W represents a monovalent radical containing a group capable of a cross-linking chemical reaction at moderate temperatures, said group being attached to a P atom by a —O— linkage; $n$ is from 20 to 2000; $c \geq o$; $a+b+c=1$; the ratio of $a:b$ is from about 1:6 to 6:1; the ratio of $c:(a+b)$ is less than about 1:5; and the Young's Modulus of said second polymer is in the range of $5 \times 10^8$ to $6 \times 10^{10}$ dynes/cm$^2$; the ratio of said first polymer to said second polymer ranging from about 1:3 to about 3:1.

4. The blend of claim 13 wherein $c=o$.

5. The blend of claim 3 wherein $c=o$ and the ratio of $a:b$ is from 1:4 to 4:1.

* * * * *

UNITED STATES PATENT OFFICE
CERTIFICATE OF CORRECTION

PATENT NO. : 4,073,824

DATED : February 14, 1978

INVENTOR(S) : Ronald L. Dieck et al

It is certified that error appears in the above-identified patent and that said Letters Patent are hereby corrected as shown below:

Column 3, line 51, after the word "about" (second occurrence), --1:10-- has been omitted.

Column 8, line 53, "ny" should read --by--.

Column 9, line 45, the word "poly" (first occurrence) should be deleted.

Column 11, line 12, in the table, "5.0x10$^9$" should read --5.03x10$^9$--.

Claim 3, column 16, line 47, that portion of the formula which reads "a+b+c=1" should read --a+b+c=2--; same claim, column 16, line 53, the numeral "13" should read --3--.

Signed and Sealed this

Twenty-third Day of May 1978

[SEAL]

Attest:

RUTH C. MASON
Attesting Officer

LUTRELLE F. PARKER
Acting Commissioner of Patents and Trademarks